United States Patent
Inamoto

(10) Patent No.: US 9,033,517 B2
(45) Date of Patent: May 19, 2015

(54) IMAGE PROCESSING METHOD, AND RECORDING MEDIUM STORING IMAGE PROCESSING CONTROL PROGRAM

(71) Applicant: Hirohisa Inamoto, Kanagawa (JP)

(72) Inventor: Hirohisa Inamoto, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 82 days.

(21) Appl. No.: 13/886,662

(22) Filed: May 3, 2013

(65) Prior Publication Data

US 2013/0329134 A1    Dec. 12, 2013

(30) Foreign Application Priority Data

Jun. 11, 2012  (JP) ................................ 2012-132083

(51) Int. Cl.
- G03B 21/14        (2006.01)
- H04N 5/21         (2006.01)
- G06T 5/00         (2006.01)
- H04N 1/387        (2006.01)
- H04N 9/31         (2006.01)

(52) U.S. Cl.
CPC ........ H04N 5/21 (2013.01); G06T 5/006 (2013.01); H04N 1/387 (2013.01); H04N 9/3185 (2013.01); H04N 9/3194 (2013.01); H04N 1/3873 (2013.01)

(58) Field of Classification Search
CPC ............................ H04N 9/3185; H04N 9/3194
USPC ............................................ 353/69; 348/745
See application file for complete search history.

(56) References Cited

U.S. PATENT DOCUMENTS

2007/0242233 A1* 10/2007 Sokeila et al. .................. 353/69
2010/0113091 A1*  5/2010 Sharma ........................ 455/556.1

FOREIGN PATENT DOCUMENTS

| JP | 2001-084365 | 3/2001 |
|----|-------------|--------|
| JP | 2003-015218 | 1/2003 |
| JP | 2004-239967 | 8/2004 |
| JP | 2006-129511 | 5/2006 |
| JP | 2008-014976 | 1/2008 |

OTHER PUBLICATIONS

Distinctive Image Features from Scale-Invariant Keypoints, David G. Lowe, Accepted Jan. 22, 2004.

A Combined corner and edge detector, Chris Harris & Mike Stephens, 1988.

* cited by examiner

*Primary Examiner* — Sultan Chowdhury
*Assistant Examiner* — Danell L Owens
(74) *Attorney, Agent, or Firm* — Cooper & Dunham LLP

(57) ABSTRACT

An image processing method includes searching an image area corresponding to a predetermined image from a photographed image obtained by photographing the predetermined image, which is projected on a projection plane; calculating parameters, which are used for correcting perspective distortion of the photographed image, based on the searched image area; and correcting the photographed image and another image, which is photographed after calculating the parameters, based on the calculated parameters.

10 Claims, 6 Drawing Sheets

PERSPECTIVE
DISTORTION

BEFORE CORRECTION　　　AFTER CORRECTION

IMAGE PROCESSING METHOD, AND RECORDING MEDIUM STORING IMAGE PROCESSING CONTROL PROGRAM

CROSS-REFERENCE TO RELATED APPLICATIONS

This patent application is based on and claims priority pursuant to 35 U.S.C. §119 to Japanese Patent Application No. 2012-132083 filed on Jun. 11, 2012 in the Japan Patent Office, the entire disclosure of which is hereby incorporated by reference herein.

FIELD OF THE INVENTION

This disclosure relates to an image processing method, and particularly to an image processing method for correcting perspective distortion. In addition, this disclosure relates to an image processing control program stored in a recording medium.

BACKGROUND OF THE INVENTION

This disclosure relates to an image processing method which uses a projector and a camera and in which a combination of an image projected by the projector and written information added to the projected image by an analogue device is stored as digital information. Such an image processing method can be used for software, which is implemented in personal computers (PC) in conjunction with a projector and a camera; projectors including a camera and a processor; mobile devices operating in conjunction with a projector; and mobile devices having a projector function.

Recently, projectors are broadly used, and meetings in which plural persons observe the same projected material (image) and discuss the material are often held. In such meetings, analogue images (i.e., additional information) are often written manually in the projected material. For example, there is a case in which points of discussion are manually written in the image projected on a screen (such as a whiteboard), or a sticky note bearing such an analog image thereon is attached to a screen. In this regard, there is a need such that such additional information is stored in a PC as digital information.

In attempting to fulfill such a need, JP-2004-239967-A discloses a projector capable of storing additional information (such as characters and figures) written on a screen such as a whiteboard.

When storing such additional information, a problem such that the image has perspective distortion tends to be caused. Specifically, when a projected image is photographed with a CCD (charge coupled device) camera, the photographing direction is not perpendicular to the surface of the projected image (i.e., the surface of the screen), and therefore perspective distortion is caused, i.e., the photographed image has a trapezoidal shape as illustrated in FIG. 12 although it is preferable for the photographed image to have a rectangle shape. Therefore, it is preferable to correct such perspective distortion of the photographed image.

Correction of perspective distortion itself is a popular technique. For example, as illustrated in FIG. 13, a method, in which a linear transformation matrix is calculated so that a trapezoidal shape is changed to a desired rectangle shape, and the matrix is used for correcting the tilt of the image, is popularly used for perspective distortion correction. The matrix is represented by the following equation, and has eight unknowns. Therefore, the solution can be obtained by using a simultaneous equation (1) having eight unknowns.

$$\begin{bmatrix} x'_t \\ y'_t \\ 1 \end{bmatrix} = \begin{bmatrix} m_0 & m_1 & m_2 \\ m_3 & m_4 & m_5 \\ m_6 & m_7 & 1 \end{bmatrix} \begin{bmatrix} x_t \\ y_t \\ 1 \end{bmatrix} \quad (1)$$

For example, in a case illustrated in FIG. 13, by specifying the four points $(x_n, y_n)$ before correction and the four points $(x'_n, y'_n)$ after correction, four equations can be obtained for each of x and y, i.e., eight equations can be obtained, thereby making it possible to obtain all the matrixes. In this regard, the suffix n ($0 \leq n \leq 4$) means the index number of a point.

By substituting the four points to the equation, the following simultaneous equation (2) can be obtained.

$$\begin{bmatrix} x'_0 \\ x'_1 \\ x'_2 \\ x'_3 \\ y'_0 \\ y'_1 \\ y'_2 \\ y'_3 \end{bmatrix} \begin{bmatrix} x_0 & y_0 & 1 & 0 & 0 & 0 & -x_0 x'_0 & -x'_0 y_0 \\ x_1 & y_1 & 1 & 0 & 0 & 0 & -x_1 x'_1 & -x'_1 y_1 \\ x_2 & y_2 & 1 & 0 & 0 & 0 & -x_2 x'_2 & -x'_2 y_2 \\ x_3 & y_3 & 1 & 0 & 0 & 0 & -x_3 x'_3 & -x'_3 y_3 \\ 0 & 0 & 0 & x_0 & y_0 & 1 & -x_0 y'_0 & -y_0 y'_0 \\ 0 & 0 & 0 & x_1 & y_1 & 1 & -x_1 y'_1 & -y_1 y'_1 \\ 0 & 0 & 0 & x_2 & y_2 & 1 & -x_2 y'_2 & -y_2 y'_2 \\ 0 & 0 & 0 & x_3 & y_3 & 1 & -x_3 y'_3 & -y_3 y'_3 \end{bmatrix} \begin{bmatrix} m_0 \\ m_1 \\ m_2 \\ m_3 \\ m_4 \\ m_5 \\ m_6 \\ m_7 \end{bmatrix} \quad (2)$$

Next, an inverse matrix of the thus obtained matrix (the left matrix of the right-hand side of formula (1)) is obtained, followed by multiplying each of the after-correction pixel positions $x'_t, y'_t$ by the inverse matrix to determine the pixel values of the before-correction positions $x_t, y_t$. By using the thus obtained pixel values as after-correction pixel values, distortion correction is performed.

As mentioned above, in order to perform popular correction of trapezoidal shape distortion, coordinates of the four points before correction and coordinates of the four points after correction have to be specified. In this regard, JP-2004-239967-A describes perspective distortion correction, but does not describe a specific method for correcting perspective distortion.

JP-2001-084365-A and JP-2006-129511-A have disclosed specific methods for correcting perspective distortion in which the points are manually designated. Since it is burden on users to manually designate points, methods in which the points are automatically detected have been proposed. For example, JP-2008-014976-A discloses a method in which the subject to be photographed is limited to a paper sheet, and the four sides of the paper sheet are determined by edge detection to determine four points before correction from the intersections of the four sides. JP-2008-014976-A does not describe the method for specifying the four points after correction, but it is considered that the four points after correction can be easily determined because the image after correction has a rectangle shape, and the aspect ratio of the rectangle shape is generally constant.

This automatic perspective distortion correction is convenient for users, but the subject to be photographed has to be clarified. For example, when the subject to be photographed is a whiteboard and the whiteboard is photographed with a camera, the four sides of the whiteboard cannot be necessarily determined because the shape of the edges of the whiteboard is unknown. In addition, the aspect ratio of whiteboard is not necessarily constant. Therefore, it is hard to automatically input the aspect ratio of the rectangle shape after correction.

BRIEF SUMMARY OF THE INVENTION

As an aspect of this disclosure, an image processing method is provided which includes searching an image area corresponding to a predetermined image from a photographed image obtained by photographing the predetermined image, which is projected on a screen; calculating parameters used for correcting perspective distortion of the photographed image based on the searched image area; and correcting the photographed image and another image, which is photographed after calculating the parameters, based on the parameters.

In another aspect, the above-mentioned image processing method may be implemented in the form of a computer program, which is stored in a non-transitory recording medium.

The aforementioned and other aspects, features and advantages will become apparent upon consideration of the following description of the preferred embodiments taken in conjunction with the accompanying drawings.

DETAILED DESCRIPTION OF THE INVENTION

The inventor recognized that there is a need for a technique in which even when the shape of the subject to be photographed is not constant, perspective distortion correction can be performed on the photographed image.

This disclosure will be described by reference to several examples.

FIRST EXAMPLE

An example of the image processing method of this disclosure will be described.
(System Configuration)

Figure 1:
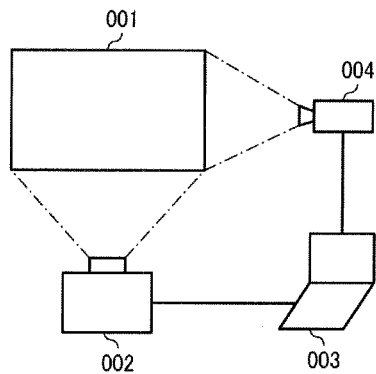
FIG. 1 is a schematic view illustrating a system used for describing an image processing method according to an embodiment.

Initially, a system for use in the image processing method of this disclosure will be described by reference to FIG. 1.

This system includes a whiteboard 001 serving as a projection plane, a projector 002 serving as a projecting device, a note PC (personal computer) 003 serving as a controller, and a camera 004 serving as an imaging device. In the note PC 003, not only software for use in displaying an image to be projected but also software which is used for photographing and which can operate in background is operated.

A user projects a material (an image) stored in the note PC 003 on the whiteboard 001 using display software and the projector 002. It is possible for the user to add new analogue information to the whiteboard 001, for example, by manually writing an image on the whiteboard or putting a tag bearing an image thereon on the whiteboard. When the user performs a predetermined operation using a keyboard (for example, by pressing an F12 key), the new information added to the whiteboard 001 is photographed by the camera 004 while perspective distortion correction is made in the note PC 003, so that the image is stored in a form such that the image can be satisfactorily observed by the user.
(Use Case of User)

Figure 2:
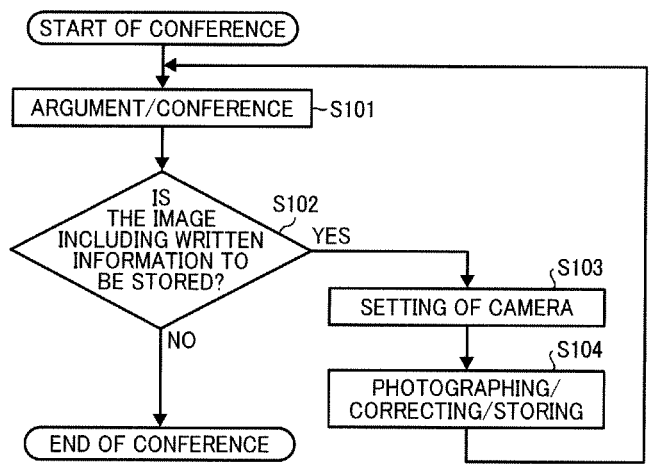
FIG. 2 is a flowchart illustrating flow of a use case using the image processing method.

Next, description of how a user uses this system in a conference will be performed by reference to FIG. 2.

When the conference is started, the user outputs an image (i.e., a material for presentation) from the projector 002, and the members of the conference observe the material and make discussion about the material (step S101). In this case, it is assumed that an additional image (hereinafter sometimes referred to as written information) is written on the image projected by the projector 002. In this regard, the additional image is written on the whiteboard 001.

If the user and the members do not wish to store the written information (NO in step S102), the conference is ended without any action. In this case, the image processing method of the present embodiment is not used. If the written information is to be stored (YES in step S102), the user sets a camera while activating photographing software in background (step S103). When the user performs a predetermined keyboard operation, the image including the written information is photographed by the camera 004, and the photographed image is subjected to perspective distortion correction using the imaging software, followed by storage in the HDD (hard disc drive) of the note PC 003 (step S104).

As mentioned above, the perspective distortion correction is made automatically without any special operation which the user should perform, and therefore this system is convenient for the user.

According to the image processing method of the present embodiment, the perspective distortion correction can be automatically performed stably even when written information is present on the whiteboard, and therefore setup of the camera and the software is performed during the conference in this use case. When the perspective distortion correction cannot be performed if the whiteboard is in a clear state, the system has to be activated from the start of the conference so as to be ready for a case where the system is used. In contrast, since the perspective distortion correction can be automatically performed stably even when written information is present on the whiteboard, and setup of the camera and the software can be performed on demand in this system, this system is convenient for users and can save energy.
(Photographing/Correcting/Storing Operation (Step S104))

Figure 3:
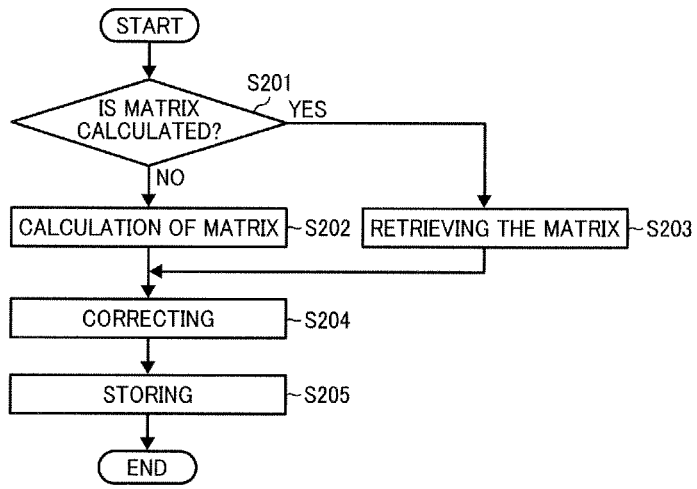
FIG. 3 is a flowchart illustrating detailed flow of step S104 in the flowchart illustrated in FIG. 2.

Next, the photographing/correcting/storing operation (step S104) in FIG. 2 will be described in detail by reference to FIG. 3. When an order to photograph is made by the user using a keyboard, it is judged whether the matrix used for perspective distortion correction is calculated (step S201). If the matrix for perspective distortion correction is calculated (YES in step S201), the matrix is retrieved (step S203). If the matrix is not yet calculated (NO in step S201), the matrix for perspective distortion correction is calculated (step S202).

In a correcting step (step S204), each of the pixel positions $x'_t, y'_t$ is multiplied by the matrix (the calculated matrix or the retrieved matrix) to determine the pixel values of the before-correction positions $x_t, y_t$. The pixel values are used as the after-correction pixel values. Thus, perspective distortion correction is performed. In this regard, since the pixel value is information stored while related to the pixel, $x_t$ and $y_t$ should be integers, but the obtained pixel values $x_t$ and $y_t$ are not necessarily integers. Therefore, the pixel values $x_t$ and $y_t$ are subjected to interpolation using pixel values of the pixels in the vicinity of the pixel. Specific examples of the interpolation method include Nearest neighbor interpolation, Bilinear interpolation, and Bicubic interpolation.

The corrected image is stored in the HDD of the note PC 003 (step S205).

(Matrix Calculation Operation (Step S202))

Figure 4:
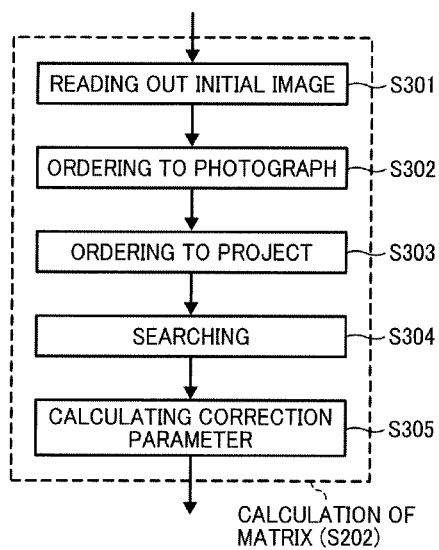
FIG. 4 is a flowchart illustrating detailed flow of step S202 in the flowchart illustrated in FIG. 3.

Next, the matrix calculation operation (step S202) will be described by reference to FIG. 4. In the matrix calculation operation, initially an initial image, which is stored in the HDD of the note PC 003, is read out (step S301), and an order to project the read-out image on the entire surface of the whiteboard 001 is made to the projector 002 (step S302). Next, the camera 004 is ordered to photograph the projected image (step S303). In this regard, the photographed image includes the initial image, and the projected image has perspective distortion. Next, a matrix, which can be used for converting the photographed image to the initial image, is obtained. Specifically, the initial image (i.e., an image area corresponding to the initial image) is searched from the photographed image (step S304), which typically includes the image area corresponding to the initial image and another image (such as a portion of projection plane on which no image is projected)), and corresponding four points of the two images (eight points in total) are detected. As mentioned above in BACKGROUND OF THE INVENTION, by substituting the four points to the equation (2), a simultaneous equation with eight unknowns can be obtained. When this simultaneous equation is subjected to numerical analysis using the Gauss-Jordan method or the like to be solved, a transformation matrix can be obtained (step S305).

In this regard, the initial image, which is stored preliminarily, is not particularly limited in this example. However, since four points of the initial image and the four points of the photographed image corresponding to the four points of the initial image are detected, the image preferably has at least four corners. It is more preferable for the initial image to have as many corners as possible because the corner selection mentioned later can be performed precisely. In addition, in order that wrong corresponding points are not detected, the initial image is preferably an aperiodic (non-periodic) image. Specific examples of such a preferable initial image include an image of stones having different shapes, and an image of a filed of grass swaying in the wind. It is preferable that an artificial image such as a corporate logo is added to such a natural object image because the resultant image has non-periodicity and therefore the selection step can be easily performed as mentioned later.

(Searching Operation (Step S304))

Figure 5:
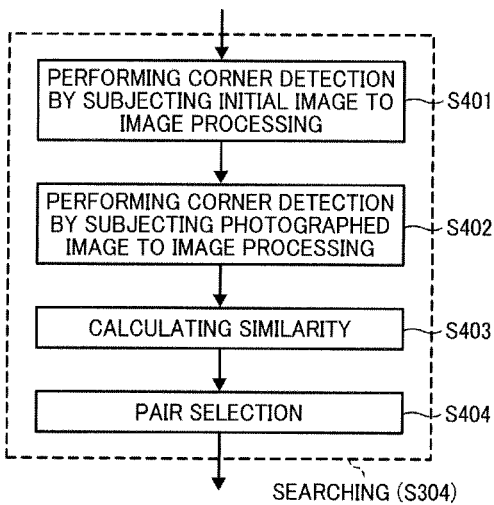
FIG. 5 is a flowchart illustrating detailed flow of step S304 in the flowchart illustrated in FIG. 4.

Next, the searching operation (step S304) will be described in detail by reference to FIG. 5. In the searching operation, initially the initial image read out from the HDD of the note PC 003 is subjected to an image processing to perform corner detection (step S401). In the corner detection method, which will be described later in detail, the position, the reference angle and the reference size of a corner, and the feature amount of the periphery of the corner are calculated at the same time. Similar processings are also performed on the photographed image, namely, the reference angle and the reference size of a corner, and the feature amount of the periphery of the corner are calculated at the same time (step S402). Next, similarity is calculated (step S403). Specifically, in step S403, Euclidean distances between the feature amounts of all the corners obtained from the initial image and the feature amounts of all the corners obtained from the photographed image are calculated to obtain the similarity. When the Euclidean distance is less than a predetermined threshold value, a corner of the initial image and a corner of the photographed image are stored as a similar pair. In this regard, it is ideal that a point of the initial image and a point of the photographed image corresponding to the point of the initial image are stored as a similar pair. However, in reality, many pairs of points which do not correspond to each other (hereinafter referred to as non-corresponding pairs) are detected. Therefore, such non-corresponding pairs are excluded in the pair selection operation (step S404).

(Initial Image Corner Detection Operation (Step S401)

Figure 6:
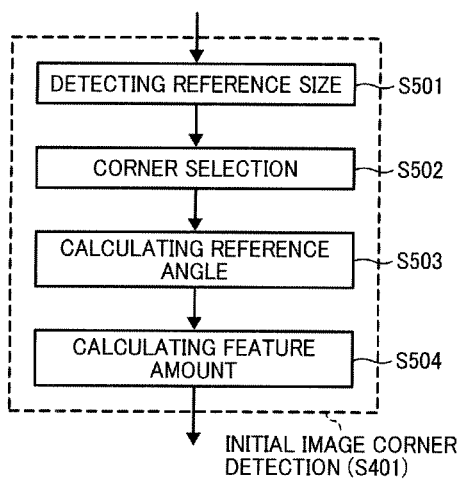
FIG. 6 is a flowchart illustrating detailed flow of step S401 in the flowchart illustrated in FIG. 5.

Next, the initial image corner detection operation (step S401) will be described in detail by reference to FIG. 6. This initial image corner operation is similar to that described in "Distinctive Image Features from Scale Invariant Keypoints" by David G. Lowe, International Journal of Computer Version, 2004, and the summary of the initial image corner operation is as follows.

Initially, the input image is subjected to an image processing to detect the reference size and the corner position at the same time (step S501). In step S501, the input image is filtered using five Gausian filters, which have gradated standard deviations ($\sigma_0$ to $\sigma_4$), to obtain plural blurred images. In each blurred image, a point, which has an extreme value in brightness in a continuous blurred image, is detected as a candidate corner. In addition, the standard deviation $\sigma_n$ of the filter, by which the extreme value can be obtained, is stored as the reference size.

Next, a candidate corner, which is obtained by the corner selection and in which variation is little or variation is caused in only one direction, is excluded (step S502). Further, a reference angle calculation operation is performed (step S503). In step S503, a direction in which concentration gradient is the largest in the periphery of a point is used as the reference angle. The method for determining the reference angle is the following.

When a point of an image has a pixel value L(u, v), a gradient strength m(u, v), and a gradient direction $\theta$(u, v), the gradient strength m(u, v) and the gradient direction $\theta$(u, v) are calculated by the following equations (3) and (4).

$$m(u, v) = \sqrt{(L(u+1, v) - L(u-1, v))^2 + (L(u, v+1) - L(u, v-1))^2} \quad (3)$$

$$\theta(u, v) = \tan\left(\frac{L(u, v+1) - L(u, v-1)}{L(u+1, v) - L(u-1, v)}\right) \quad (4)$$

Next, a histogram which is prepared by changing the gradient direction $\theta$(u, v) at regular intervals of angles of 10 degrees in 36 different directions is obtained. In the histogram, a value obtained by multiplying the gradient strength m(u, v) by a Gausian of an attention pixel is added. In the thus obtained histogram, the direction having the largest angle is the direction having the most large variation, i.e., the reference direction.

Next, the feature amount calculation operation is performed (step S504). In step S504, a corner of the input image and a periphery thereof having a diameter of $2\sigma_n$ are divided into 16 blocks (i.e., 4×4 blocks). In this regard, the reference direction is the upper direction. A gradient histogram in eight directions is prepared for each block, wherein the direction is changed by 45 degrees ($^{360}/_8$=45). Thus, a feature amount with a dimension of 128 (i.e., 4×4×8) can be obtained.

(Corner Selection Operation (Step S502))

This corner selection method is described in "A combined corner and edge detector" by C. Harris and M. Stephens (1998). The summary thereof is the following.

Figure 7:
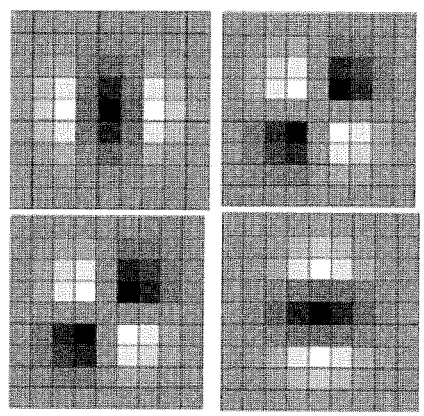
FIG. 7 is a schematic view illustrating a differential filter used for step S502 in the flowchart illustrated in FIG. 6.

As illustrated in FIG. 7, secondary differentiation in the vertical direction, secondary differentiation in the horizontal direction, and differential filter in the vertical and horizontal directions are applied to each pixel to obtain a response representing variation in the vertical direction, variation in the horizontal direction, and variation in the vertical and horizontal directions. Thus, a Hessian matrix is prepared.

Figure 8:
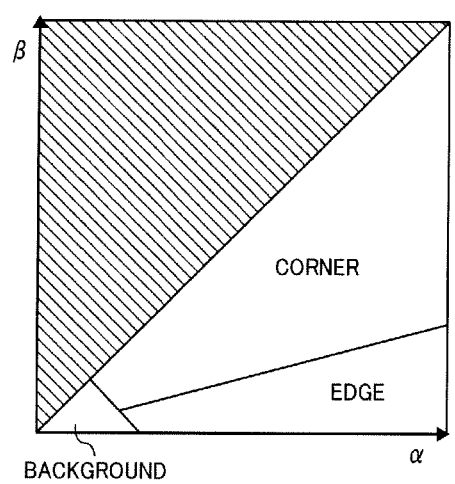
FIG. 8 is a schematic view used for describing the operation of step S502 in the flowchart illustrated in FIG. 6.

By obtaining the eigenvalue thereof, the direction having the largest variation and the variation component α thereof can be obtained. Similarly, the variation component β in the direction perpendicular to the direction having the largest variation can also be obtained. In this regard, the relation between α and β for different areas (structures) of the image is illustrated in FIG. 8. Since α is not less than β, the area illustrated by diagonal lines in FIG. 8 is not present. When the smaller variation β is sufficiently large, the periphery of the attention pixel has large variation in at least two directions, and therefore the area is not an area of nothing or a simple edge. Therefore, the area can be detected as a corner.

When an area having variation in the vertical and horizontal directions is detected as a corner, variation in an oblique direction cannot be detected. In contrast, detecting variation in various directions to detect variation in an oblique direction is inefficient. However, by checking the smaller variation β to obtain the eigenvalue, variation whose direction is perpendicular to the largest variation direction can be identified. By making judgment such that when the smaller variation β is sufficiently large, the area is a corner, corners facing in various directions can be efficiently detected. Therefore, calculation costs for corner detection can be decreased.

(Photographed Image Corner Detection Operation (Step S402))

In the photographed image corner detection operation (step S402), the same operation as the initial image corner detection operation (step S401) is performed on the photographed image to calculate the position, the reference angle, and the reference size of the corner, and the feature amount of the periphery thereof can be calculated.

(Pair Selection Operation (Step S404))

In the pair selection operation (step S404), an operation like the Hough transform, which is described in "Distinctive Image Features from Scale Invariant Keypoints" by David G. Lowe, International Journal of Computer Version, 2004, is performed to exclude a non-corresponding pair. Thus, good corresponding pairs of corners can be selected. Such good corresponding pairs of corners are hereinafter sometimes referred to as pairs of corners having high reliability. In this application, a well-corresponding pair of corners is hereinafter sometimes referred to as a pair of corners having high reliability.

As mentioned above, since the reference angle and the reference size of the corner are obtained, the attitude of the photographed image of the initial image can be estimated from one of the corners included in the photographed image. This estimated value is quantized, and the attitude estimated from many corners is the correct attitude of the photographed image. Corners from which other attitudes are estimated are incorrect corners, and therefore the incorrect corners are excluded. As mentioned above, the attitude is estimated by a majority decision while excluding incorrect corners, and therefore the number of corners detected from the initial image is as many as possible, namely a busy image is preferable.

Four corners of the image having the thus estimated attitude are the four points from which a correction matrix can be calculated.

As mentioned above, by matching the initial image (i.e., an image area corresponding to the initial image) included in the photographed image with the initial image, perspective distortion correction is performed. Performing this matching by using corners has a number of advantages.

One of the advantages is that since the entire image of the initial image is not compared with the photographed image, calculation costs are low.

In addition, since the reference angle is calculated for each corner, the automatic perspective distortion correction can be stably performed even when rotation occurs.

Further, since the reference size is calculated for each corner, the automatic perspective distortion correction can be stably performed even when the distance between the imaging device and the projection plane changes.

Among the advantages, the greatest advantage is that since matching is performed while paying attention to local points without comparing the entire image of the initial image with the photographed image, the automatic perspective distortion correction can be stably performed even when appearance of part of the initial image is largely different from that of the projected initial image. Therefore, even in a case where this system is used in the middle of a conference, the automatic perspective distortion correction can be stably performed even when additional information has been written on the whiteboard before using the system.

SECOND EXAMPLE

Figure 9:
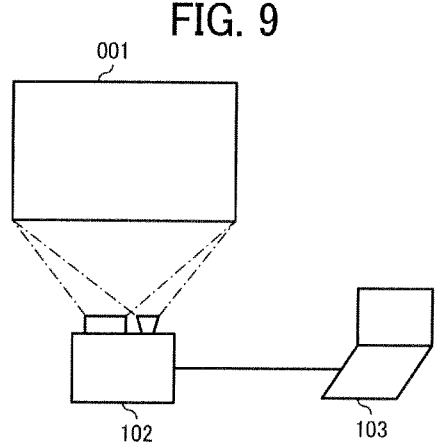
FIG. 9 is a schematic view illustrating another system used for describing the image processing method.

In this second example, the operations are the same as those of the first example, but some of the devices constituting the system are different as illustrated in FIG. 9. Specifically, as illustrated in FIG. 9, the camera 004 constituting the system of the first example is a part of a projector 102 in this second example.

THIRD EXAMPLE

Figure 10:
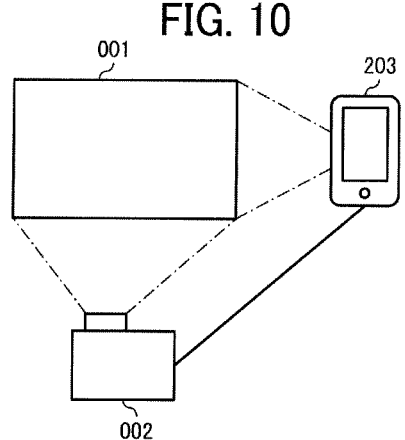
FIG. 10 is a schematic view illustrating yet another system used for describing the image processing method.

In this third example, the operations are the same as those of the first example, but some of devices constituting the system are different as illustrated in FIG. 10. Specifically, as illustrated in FIG. 10, a combination of the note PC 003 and the camera 004 is replaced with a smartphone 203. In general, since smartphone has a CPU (central processing unit), the image processing mentioned above in the first example can be performed thereby. In addition, since smartphone typically includes a camera, the functions of the note PC 003 and the camera 004 can be performed by such a smartphone and the same effects can be produced.

FOURTH EXAMPLE

Figure 11:
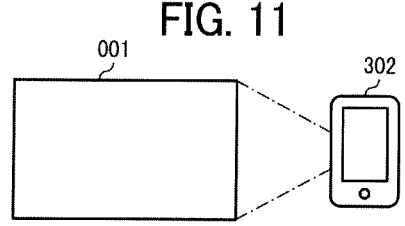
FIG. 11 is a schematic view illustrating a further system used for describing the image processing method.
Figure 12:
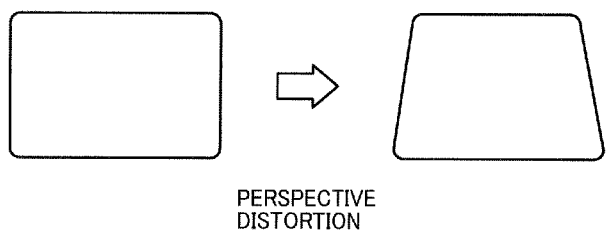
FIG. 12 is a schematic view used for describing perspective distortion.
Figure 13:
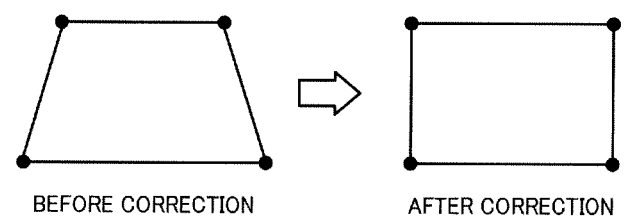
FIG. 13 is a schematic view used for describing perspective distortion correction.

In this fourth example, the operations are the same as those of the first example, but some of devices constituting the system are different as illustrated in FIG. 11. Specifically, as illustrated in FIG. 11, a combination of the note PC 003, the camera 004, and the projector 002 is replaced with a smartphone 302. In general, since smartphone has a CPU, the image processing mentioned above in the first example can be performed thereby. In addition, smartphone typically includes a camera. Further, recently smartphone having a projector function has been marketed. Therefore, the functions of the note PC 003, the camera 004, and the projector 002 can be performed by the smartphone 302, and the same effects can be produced.

(Effects Of The Examples)

In the examples mentioned above, matching of a projected image with a photographed image is performed to perform perspective distortion correction. In this regard, since the aspect ratio of the projected image is known, perspective distortion correction can be automatically performed stably even when the shape and color of the projection plane are different. Therefore, the system is convenient for users.

In addition, in the examples mentioned above, matching of an initial image with an image area of a photographed image corresponding to the initial image is performed while paying attention to corners thereof, the amount of calculation of automatic perspective distortion can be decreased.

In the examples mentioned above, it is preferable to use, as an initial image, a busy image which has as many corners as possible. The number of corners used for perspective distortion correction is at least four. In this regard, it is preferable to increase the redundancy of the number of corners in order to stably perform the automatic perspective distortion correction even when some pairs of corners are not detected. Namely, even when something is written on the projection plane or something is projected on the projection plane, the automatic perspective distortion correction can be stably performed.

In the examples mentioned above, by performing corner detection with plural resolutions, the automatic perspective distortion correction can be stably performed even when the distance between the projection plane and the imaging device is different.

In the examples mentioned above, the reference angle and the reference size can be determined by the corner detection operation. Therefore, detecting one corner makes it possible to estimate the direction of the image. Even in a case where the direction of the image is estimated from multiple corners including inaccuracy, a large number of estimation results including the correct direction information are output while a small number of estimation results including incorrect direction information are output. Therefore, by using decision by a majority, only the correct direction can be selected even when the pair detection includes inaccuracy, and thereby the precision of the automatic perspective distortion correction can be enhanced.

Provided that the eigenvalues of the Hessian matrix are $\alpha$ and $\beta$ ($\alpha > \beta$) in a position, an area having small $\beta$ has a large concentration gradient in one direction, and an area having large $\beta$ has a large concentration gradient in two directions. According to the examples mentioned above, corners facing various directions can be efficiently detected, thereby decreasing the calculation costs used for corner detection.

By using the present invention, perspective distortion correction can be performed on a photographed image even when the shape of the subject to be photographed is not constant.

Any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC (Application Specific Integrated Circuits), prepared by interconnecting an appropriate network of conventional component circuits or by a combination thereof with one or more conventional general purpose microprocessors and/or signal processors programmed accordingly.

Additional modifications and variations of the present invention are possible in light of the above teachings. It is therefore to be understood that within the scope of the appended claims the invention may be practiced other than as specifically described herein.

What is claimed is:

1. An image processing method comprising:
    searching an image area corresponding to a predetermined image from a photographed image obtained by photographing the predetermined image, which is projected on a projection plane;
    calculating parameters, which are used for correcting perspective distortion of the photographed image, based on the searched image area; and
    correcting the photographed image and another image, which is photographed after calculating the parameters, based on the calculated parameters,
    wherein the searching step includes:
        detecting corners of each of a predetermined image and a photographed image including the predetermined image, which is projected on a projection plane;
        calculating similarity of the detected corners of the predetermined image with the detected corners of the photographed image; and
        selecting pairs of corners of the predetermined image and the photographed image, which have relatively high reliability among pairs of corners having high similarity to search an image area corresponding to the predetermined image, and
    wherein the corner detecting step is performed at plural resolutions to calculate a reference size of each of the corners.

2. The image processing method according to claim 1, wherein the predetermined image is an image, for which at least five corners are detected in the predetermined image in the corner detecting step,
    wherein each point from a plurality of points with a high brightness in the image is designated as a corner.

3. The image processing method according to claim 1, wherein the corner detection step is performed by calculating a reference direction of each of the corners based on image brightness gradient of periphery of the corner.

4. The image processing method according to claim 3, wherein the corner detecting step includes:
    calculating feature amount of the periphery based on the reference direction and the reference size,
    wherein the similarity calculating step includes:
    calculating similarity of the detected corners of the predetermined image with the detected corners of the photographed image based on similarity of the calculated feature amount, and
    wherein the selection step includes:
    estimating attitude of the predetermined image in the photographed image based on the reference direction and the reference size of a pair of corners having a relatively high similarity; and selecting pairs of corners by which substantially same attitude of the predetermined image is estimated by decision of a majority.

5. The image processing method according to claim 1, wherein the corner detection step includes:
   detecting as a corner a point of each of a predetermined image and a photographed image, which has periphery having a relatively small eigenvalue of 2×2 Hessian matrix, wherein the eigenvalue is greater than a threshold value.

6. A non-transitory recording medium storing a plurality of instructions which, when executed by a processor, cause the processor to perform an image processing method comprising:
   searching an image area corresponding to a predetermined image from a photographed image obtained by photographing the predetermined image, which is projected on a projection plane;
   calculating parameters, which are used for correcting perspective distortion of the photographed image, based on the searched image area; and
   correcting the photographed image and another image, which is photographed after calculating the parameters. based on the calculated parameters,
   wherein the searching step includes:
      detecting corners of each of a predetermined image and a photographed image including the predetermined image, which is projected on a projection plane:
      calculating similarity of the detected corners of the predetermined image with the detected corners of the photographed image; and
      selecting pairs of corners of the predetermined image and the photographed image, which have relatively high reliability among pairs of corners having high similarity to search an image area corresponding to the predetermined image,
   wherein the corner detected step is performed at plural resolutions to calculate a reference size of each of the corners.

7. The non-transitory recording medium according to claim 6, wherein the predetermined image is an image, for which at least five corners are detected in the predetermined image in the corner detecting step,
   wherein each point from a plurality of points with a high brightness in the image is designated as a corner.

8. The non-transitory recording medium according to claim 6, wherein the corner detection step is performed by calculating a reference direction of each of the corners based on image brightness gradient of periphery of the corner.

9. The non-transitory recording medium according to claim 8, wherein the corner detecting step includes:
   calculating feature amount of the periphery based on the reference direction and the reference size,
   wherein the similarity calculating step includes:
   calculating similarity of the detected corners of the predetermined image with the detected corners of the photographed image based on similarity of the calculated feature amount, and
   wherein the selection step includes:
   estimating attitude of the predetermined image in the photographed image based on the reference direction and the reference size of a pair of corners having a relatively high similarity; and
   selecting pairs of corners by which substantially same attitude of he predetermined image is estimated by decision of a majority.

10. The non-transitory recording medium according to claim 6, wherein the corner detection step includes:
    detecting as a corner a point of each of a predetermined image and a photographed image, which has periphery having a relatively small eigenvalue of 2=2 Hessian matrix, wherein the eigenvalue is greater than a threshold value.

* * * * *